UNITED STATES PATENT OFFICE.

LOUIS E. BARTON, OF NIAGARA FALLS, NEW YORK, AND HENRY A. GARDNER, OF WASHINGTON, DISTRICT OF COLUMBIA, ASSIGNORS TO THE TITANIUM ALLOY MANUFACTURING COMPANY, OF NEW YORK, N. Y., A CORPORATION OF MAINE.

RUBBER AND METHOD OF OBTAINING THE SAME.

1,326,319. Specification of Letters Patent. Patented Dec. 30, 1919.

No Drawing. Application filed January 2, 1917. Serial No. 140,118.

*To all whom it may concern:*

Be it known that we, LOUIS E. BARTON, a resident of Niagara Falls, in the State of New York, and HENRY A. GARDNER, residing in the city of Washington and District of Columbia, and being both citizens of the United States, have jointly invented certain new and useful Improvements in Rubber and Methods of Obtaining the Same, of which the following is a specification.

The invention relates more particularly to vulcanized rubber products, and their manufacture, and its objects comprise imparting thereto, more easily, speedily, certainly, and economically than heretofore, desired properties whereby tensile strength, toughness, set and stretch are, according to conditions or requirement, respectively comprehensively improved and colorations whiter than hitherto, imparted.

We attain these objects by our herein described novel rubber products, the which are in part dependent upon the original discovery by one of us, *i. e.*, Louis E. Barton, that, broadly speaking titanium in a state of chemical combination, and preferably in the form of titanic oxid ($TiO_2$), possesses peculiar properties which enable it when, anlogously to a "filler", incorporated with rubber to impart to the latter, and the resulting mixture, before, during, and after, its vulcanization, novel characteristics and behavior to which are primarily, attributable the improved, and novel, qualities and properties of our final rubber products.

Our said novel compositions of matter are, by the practice of our novel methods obtained, for example, as follows, viz:

The rubber, washed as usual, is "worked" as usual in the usual compounding rolls, until the mass becomes warm and plastic. There is then, the rolling being continued, added thereto gradually, and in successive quantities, the preferred compound of titanium, in this instance, titanic oxid ($TiO_2$), in such association with other substances and to the extent required, per our present invention, as to impart such quality or consistency to the final product as may be desired.

If the mixture is to be vulcanized, we prefer to simultaneously incorporate the required sulfur, by aid of preliminarily thoroughly mixing the latter with the titanic material, and adding such mixture to the rubber as aforesaid until sufficiently incorporated. After thorough incorporation the mass is, as usual, removed from the rolls, sheeted, or formed, and then vulcanized, or cured.

As to proportions of the materials, these will be varied by those skilled in the art according to circumstances and the particular properties sought in the final products.

Our tests and operations have further demonstrated that the titanic oxid has apparently an exceptionally great affinity for the rubber, since, during the compounding, it slides in rapidly and does not form hard scales, nor does it cake unduly upon the metal surface of the rolls, as is too often characteristic of other additions. It also apparently hastens the vulcanization, since without aid of the usually added "accelerators", the curing takes place with very great, if not unprecedented, rapidity.

The titanic oxid also imparts to the mass an intense, and to the final vulcanized product an unprecedently great, degree of whiteness, which seems attributable to the index of refraction of said oxid being higher (2.5 to 2.9) than that of any pigment substance, other than titanic, utilizable, for the purpose, in rubber, and, therefore, its hiding, or coloring, power and effects on the product proportionately greater. Its effects in these regards are particularly noticeable on coloration if lead oxid be added, in which case the vulcanized product will be of a lighter shade of gray than attainable without the titanic addition, and, instead of the darker gray or black hitherto inevitable from presence of the lead sulfid or other compounds formed in curing.

The titanic oxid is distinctively uninjurious to the rubber, since the exceptionally refractory character of the former renders it correspondingly stable, both during vulcanization, and thereafter throughout the life of the final product,—it thus neither liberating nor attracting reagents deleterious to rubber, such, for example, as oxygen.

The titanic oxid, is, also, for the purpose especially advantageous owing to its low specific gravity (not exceeding 4.25) as compared with that of most other pigment, rubber-compounding, substances.

While titanic oxid in any form may, in some respects at least, prove serviceable, we prefer to employ, for the purposes of our present invention, owing to their purity, whiteness, low specific gravity, fineness and smoothness, one, or more, of those powdered forms of titanic oxid concentrates obtainable by aid of such processes as are disclosed in U. S. Letters Patent granted to Auguste J. Rossi and Louis E. Barton Nos. 1,106,406, 1,106,407, 1,106,408, 1,106,409, 1,106,410, dated August 11, 1914, No. 1,166,547, dated January 4, 1916, No. 1,171,542, dated February 15, 1916, and Nos. 1,196,029, 1,196,030 and 1,196,031, dated August 29, 1916; also, to Louis E. Barton, No. 1,189,229, dated July 4, 1916, No. 1,201,541, dated October 17, 1916, and Nos. 1,206,796, 1,206 797, and 1,206,798, dated December 5, 1916.

A principal feature of our present invention is our discovery that the so-called "composite titanic oxid" pigments disclosed in U. S. Letters Patent granted to Louis E. Barton No. 1,155,462, dated October 5, 1915, or No. 1,205,144, dated November 21, 1916, afford excellent media for incorporating the titanic oxid with the rubber as aforesaid.

Such composite pigments are characterizable as consisting essentially of particles of a sulfate base, for example calcium sulfate, or, and preferably, barium sulfate (blanc fixe) having thereto adherent and therewith coalesced very minute particles of titanic oxid usually in the ratio of about 22% of the oxid to 78% of the base and their specific gravities running as low as from 2.95 to 3.10.

We have also found that, for certain special uses, it is advantageous to combine, in various proportions, as required, the titanic oxid with another pigment substance, or substances, serviceable as rubber fillers, e. g., lead oxid aforesaid, or zinc oxid, or lithopone, the respective proportions of which will be indicated to those skilled in the art by the respective uses or purposes for which the respective rubber products are designed. For example, that a very superior grade of tire stock is producible by using, in the compounding, as a medium for incorporating the titanic oxid, one of said composite titanic oxid pigments, and that in such case an addition of zinc oxid is, for some purposes, of advantage. In such instances, the following proportions of ingredients are, for example, suitable, viz:

Washed rubber _____ 500 parts by weight
Composite titanic oxid pigment _____ 200 parts by weight
Sulfur _____ 50 parts by weight
Zinc oxid _____ 250 parts by weight For special uses, we add to this mixture, and without detriment to its characteristic properties and effects, such quantity as may be indicated of any usual black carbon pigment; likewise, when exceptional rapidity of vulcanization, or curing, is for any reason, required, lead oxid (say from 25 to 50 parts by weight) or any of the usual organic accelerators, and in such quantities as may be needed, the which will be proportionately less than hitherto, owing to the said cure-accelerating properties of the titanic oxid.

Having now described our invention, what we claim as new and desire to secure by Letters Patent, is the following, viz:

1. Rubber having therewith incorporated sulfate particles coalesced with thereto adherent titanic oxid.

2. Rubber having therewith incorporated titanic oxid and zinc oxid.

3. Rubber having therewith incorporated sulfur, titanic oxid and zinc oxid.

4. Rubber having therewith incorporated titanic oxid, zinc oxid, and a black carbon pigment.

5. Rubber havng therewith incorporated sulfur, titanic oxid, zinc oxid, and a black carbon pigment.

6. The method of treating rubber which comprises incorporating therewith sulfur, titanic oxid, and zinc oxid, and vulcanizing the mixture.

7. The method of treating rubber which comprises incorporating therewith sulfur, titanic oxid, zinc oxid and a black carbon pigment, and vulcanizing the mixture.

8. The method of treating rubber which comprises incorporating therewith sulfur, titanic oxid, zinc oxid, a black carbon pigment, and an accelerator of vulcanization other than titanic oxid, and vulcanizing the mixture.

9. The method of treating rubber which comprises incorporating therewith sulfate particles coalesced with thereto adherent particles of titanic oxid.

10. The method of treating rubber which comprises incorporating therewith sulfur and sulfate particles coalesced with thereto adherent particles of titanic oxid and vulcanizing the mixture.

11. The method of treating rubber which comprises incorporating therewith sulfur and particles of barium sulfate (blanc fixe) coalesced with thereto adherent particles of titanic oxid, and vulcanizing the mixture.

12. Rubber having therewith incorporated particles of barium sulfate (blanc fixe) coalesced with thereto adherent titanic oxid.

LOUIS E. BARTON.
HENRY A. GARDNER.

Witnesses as to Louis E. Barton:
  Tom C. Graham,
  C. P. Reisig.
Witnesses as to Henry A. Gardner:
  Bertha P. Isaacs,
  Norman B. Frost.